(12) United States Patent
Hu et al.

(10) Patent No.: US 11,210,284 B2
(45) Date of Patent: Dec. 28, 2021

(54) METHOD, SYSTEM, APPARATUS, AND COMPUTER-READABLE STORAGE MEDIUM FOR SHARING ACCOUNT RESOURCES

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Wensong Hu, Beijing (CN); Zhen Liu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 251 days.

(21) Appl. No.: 16/329,350

(22) PCT Filed: Aug. 1, 2018

(86) PCT No.: PCT/CN2018/097910
§ 371 (c)(1),
(2) Date: Feb. 28, 2019

(87) PCT Pub. No.: WO2019/071997
PCT Pub. Date: Apr. 18, 2019

(65) Prior Publication Data
US 2021/0011903 A1    Jan. 14, 2021

(30) Foreign Application Priority Data
Oct. 12, 2017   (CN) .......................... 201710948122.7

(51) Int. Cl.
*G06F 16/00*     (2019.01)
*G06F 16/23*     (2019.01)
(Continued)

(52) U.S. Cl.
CPC ........ *G06F 16/2379* (2019.01); *G06F 16/219* (2019.01); *G06F 16/24578* (2019.01);
(Continued)

(58) Field of Classification Search
CPC .............. H04L 63/083; H04L 63/0846; H04L 63/0838; H04L 67/22; H04L 63/102;
(Continued)

(56) References Cited

U.S. PATENT DOCUMENTS 8,285,658 B1 * 10/2012 Kellas-Dicks ........... G06N 5/02
706/20
8,366,550 B2 * 2/2013 Herrmann ........... G07F 17/3237
463/42
(Continued)

FOREIGN PATENT DOCUMENTS

CN   103237307 A   8/2013
CN   104219204 A   12/2014
(Continued)

OTHER PUBLICATIONS

Jian Liang et al., "Online multiple profile manager for eHealth information sharing", Selected Areas in Communications Symposium, IEEE ICC 2012, pp. 3461-3465.*
(Continued)

*Primary Examiner* — Srirama Channavajjala
(74) *Attorney, Agent, or Firm* — The Webb Law Firm

(57) ABSTRACT

The present disclosure provides a method, a system, an apparatus and a computer-readable storage medium for sharing account resources. The method for sharing account resources comprises: acquiring an account of an original user satisfying a preset recycling condition; saving user information of the original user to a resource library, and adding the account of the original user to an allocatable account library; receiving a request for allocating an account
(Continued)

from a requesting user, and allocating an account for the requesting user from the allocatable account library.

14 Claims, 2 Drawing Sheets

(51) Int. Cl.

| | | |
|---|---|---|
| *G06F 16/9535* | (2019.01) | |
| *G06F 16/2457* | (2019.01) | |
| *G06F 16/33* | (2019.01) | |
| *G06F 16/68* | (2019.01) | |
| *G06F 16/21* | (2019.01) | |
| *G06Q 10/10* | (2012.01) | |
| *G06Q 30/00* | (2012.01) | |

(52) U.S. Cl.
CPC ............ *G06F 16/33* (2019.01); *G06F 16/686* (2019.01); *G06F 16/9535* (2019.01); *G06Q 10/105* (2013.01); *G06Q 30/018* (2013.01)

(58) Field of Classification Search
CPC ......... H04L 63/08; H04L 63/18; G06F 21/31; G06F 21/46; G06F 21/50; G06F 16/2379; G06F 16/9535; G06F 16/24578; G06F 16/29; G06F 16/33; G06F 16/219; G06F 16/686; G06Q 10/105; G06Q 20/405; G06Q 20/17; G06Q 30/018; G06Q 30/0255; G06Q 30/0224; G06Q 50/01; G06Q 40/02; G06Q 40/12; G06Q 20/108; G06Q 20/227; G06Q 30/0215; G06Q 30/0222

See application file for complete search history.

(56) References Cited

U.S. PATENT DOCUMENTS

| | | | |
|---|---|---|---|
| 8,631,478 B2 | 1/2014 | Chen et al. | |
| 8,639,824 B1 * | 1/2014 | Basu | G06F 9/468 709/229 |
| 9,022,869 B1 * | 5/2015 | DeSanti | A63F 13/00 463/42 |
| 9,503,451 B1 * | 11/2016 | Kane-Parry | H04L 63/1441 |
| 9,740,435 B2 * | 8/2017 | Dolce | G06F 16/183 |
| 9,997,023 B2 * | 6/2018 | Fine | G07F 17/326 |
| 10,201,754 B1 * | 2/2019 | Topkins | A63F 13/69 |
| 10,241,650 B1 * | 3/2019 | Pasoi | G06F 3/0482 |
| 2002/0052812 A1 * | 5/2002 | Braverman | G06Q 30/04 705/34 |
| 2007/0238528 A1 * | 10/2007 | Harris | A63F 13/75 463/42 |
| 2009/0044237 A1 * | 2/2009 | Keiter | H04N 21/8133 725/91 |
| 2009/0089757 A1 * | 4/2009 | Rajan | G06F 11/3684 717/124 |
| 2010/0153224 A1 * | 6/2010 | Livnat | G06Q 20/202 705/21 |
| 2011/0289597 A1 * | 11/2011 | Hinds | G06F 21/42 726/28 |
| 2012/0017094 A1 * | 1/2012 | Tulchinsky | G06F 21/6263 713/182 |
| 2014/0279526 A1 * | 9/2014 | Jackson | G06Q 20/405 705/44 |
| 2016/0006720 A1 * | 1/2016 | Spaulding | G06F 21/316 726/8 |
| 2016/0094529 A1 * | 3/2016 | Mityagin | H04L 63/08 726/7 |
| 2016/0255078 A1 * | 9/2016 | Zhang | H04L 63/18 726/4 |
| 2016/0350783 A1 * | 12/2016 | Sharma | G06Q 30/0222 |
| 2016/0350848 A1 * | 12/2016 | Acharya | G06Q 40/02 |
| 2017/0064550 A1 * | 3/2017 | Sundaresan | H04L 63/105 |
| 2017/0099311 A1 * | 4/2017 | Kesin | H04L 63/1416 |
| 2017/0153917 A1 * | 6/2017 | Zhao | G06Q 10/06 |
| 2018/0075081 A1 * | 3/2018 | Chipman | G06Q 20/367 |

FOREIGN PATENT DOCUMENTS

| | | | |
|---|---|---|---|
| CN | 104852903 A | | 8/2015 |
| CN | 105847277 A | | 8/2016 |
| CN | 107689966 A | | 2/2018 |
| WO | WO 2007076209 A1 | * | 7/2007 |
| WO | WO 2015127784 | * | 9/2015 |
| WO | WO 2015/161284 | * | 10/2015 |
| WO | WO2017184475 A1 | * | 10/2017 |

OTHER PUBLICATIONS

Barry Varley, Usage Accounting in Distributed Systems, For presentation at IEE Colloquium on Network Management, Oct. 4, 1991 pp. 1-8.*

First Office Action for CN Appl. No. 201710948122.7, dated Apr. 12, 2019.

International Search Report and Written Opinion for International Appl. No. PCT/CN2018/097910, dated Sep. 30, 2018.

* cited by examiner

METHOD, SYSTEM, APPARATUS, AND COMPUTER-READABLE STORAGE MEDIUM FOR SHARING ACCOUNT RESOURCES

CROSS-REFERENCE TO RELATED APPLICATIONS

This application is a U.S. National Stage under 35 U.S.C. § 371 of International Application No. PCT/CN2018/097910, filed on Aug. 1, 2018, which claims priority to and the benefit of Chinese Patent Application 201710948122.7, filed on Oct. 12, 2017, the content of both of which are incorporated herein by reference in entirety for all purposes.

TECHNICAL FIELD

The present disclosure relates to method, system, apparatus and computer-readable storage medium for sharing account resources.

BACKGROUND

At present, informatization construction has played a pivotal role in the development of enterprises. Generally, an IT system for enterprise informatization management is employed during a process of the informatization. Some important IT systems may charge by a number of IT accounts, and the account fees for such systems may be relatively high. During an actual use process, however, some users may just use the IT system occasionally, as a result of which use frequencies for some accounts may be very low, thereby bringing increased cost to the enterprises. Therefore, it is an urgent problem to solve currently that how to promote account utilization ratio and reduce the cost in the IT system construction for the enterprises.

SUMMARY

According to at least one embodiment of the present disclosure, a method for sharing account resources is provided, which comprises: acquiring an account of an original user satisfying a preset recycling condition; saving user information of the original user satisfying the preset recycling condition to a resource library, and adding the account of the original user satisfying the preset recycling condition to an allocatable account library; and receiving a request for allocating an account from a requesting user, and allocating an account for the requesting user from the allocatable account library.

In an example, the acquiring the account of the original user satisfying the preset recycling condition comprises: acquiring at least one of use frequency or use duration for the account of the original user, determining whether the at least one of use frequency or use duration satisfies the preset recycling condition, and if yes, marking the account of the original user as the account of the original user satisfying the preset recycling condition.

In an example, the acquiring the at least one of use frequency or use duration for the account of the original user comprises: querying the at least one of use frequency or use duration for the account of the original user periodically to acquire the account of the original user satisfying the preset recycling condition; or automatically marking the account of the original user as the account of the original user satisfying the preset recycling condition if the at least one of use frequency or use duration for the account of the original user satisfies the preset recycling condition.

In an example, the acquiring the account of the original user satisfying the preset recycling condition comprises: acquiring a list of accounts for original users satisfying preset alternative recycling conditions; ranking accounts in the list of accounts according to use frequencies, and taking accounts with low use frequencies as the accounts of the original users satisfying the preset recycling condition.

In an example, after acquiring the account of the original user satisfying the preset recycling condition, the method comprises: reading a current use duration and a historical use duration for the original user and calculating a next use duration to be saved to the use information of the original user.

In an example, before adding the account of the original user satisfying the preset recycling condition to the allocatable account library, the method comprises: sending a notification message to the original user.

In an example, before adding the account of the original user satisfying the preset recycling condition to the allocatable account library, the method comprises: determining whether the account of the original user is in a use state; if no, adding the account of the original user satisfying the preset recycling condition to the allocatable account library.

In an example, after allocating the account for the requesting user from the allocatable account library, the method comprises: determining whether there is corresponding user information of the requesting user in the resource library; and if yes, associating the account allocated to the requesting user with the corresponding user information of the requesting user saved in the resource library.

In an example, the user information includes an identification ID of the user, the received request for allocating an account from the requesting user comprises an identification ID of the requesting user; the determining whether there is corresponding user information of the requesting user in the resource library comprises: comparing the identification ID of the requesting user with identifications ID in user information saved in the resource library, so as to acquire user information corresponding to the identification ID of the requesting user.

In an example, the determining whether there is corresponding user information of the requesting user in the resource library comprises: determining whether there is corresponding user information of the requesting user in the resource library; and if no, matching the requesting user with default user information, and associating the account allocated to the requesting user with the default user information.

In an example, the user information includes one or more of the user's identification ID, historical use duration, current use duration, next use duration, use frequency, user permissions, and collection information.

In an example, the method further comprises: making statistics on and outputting one or more of account information that has been associated with user information, account information in the allocatable account library, and user information saved in the resource library.

According to at least another one embodiment of the present disclosure, a system for sharing account resources is provided, which comprises: an acquisition module configured to acquire an account of an original user satisfying a preset recycling condition; a recycling module configured to save user information of the original user satisfying the preset recycling condition to a resource library, and to add the account of the original user satisfying the preset recycling condition to an allocatable account library; and an allocation module configured to receive a request for allocating an account from a requesting user, and to allocate an account for the requesting user from the allocatable account library.

According to at least another one embodiment of the present disclosure, a computer-readable storage medium storing computer programs thereon is provided, the computer programs when executed implementing the steps of any one of the above-described methods for sharing account resources.

According to at least another one embodiment of the present disclosure, an apparatus for sharing account resources is provided, which comprises a computer-readable storage medium, a processor, and computer programs stored on the computer-readable storage medium and executed on the processor; when the processor executes the computer programs, the steps of any one of the above-described methods for sharing account resources are implemented.

BRIEF DESCRIPTION OF THE DRAWINGS

The above-described and additional aspects and advantages of the present disclosure will become clear and easily understood from the following description of embodiments in conjunction with the accompanying drawings, wherein.

DETAILED DESCRIPTION

Embodiments of the present disclosure will be described below in detail. Examples of the embodiments are shown in the accompanying drawings, in which same or similar numerals throughout denote same or similar elements or elements having same or similar functions. The embodiments described below with reference to the accompanying drawings are merely exemplary intended for purposes of illustration only, and are not intended to be construed as limitations to the present disclosure.

Those skilled in the art would understand, unless expressly stated, singular forms "a", "an", and "the" as used herein may also include plural forms. It should be further understood that the phrase "comprise" or "include" as used in the specification of the present disclosure refers to the presence of said features, integers, steps, operations, elements and/or components, but does not exclude the presence or addition of one or more other features, integers, steps, operations, elements, components and/or groups thereof.

Those skilled in the art would understand, unless otherwise defined, all the terms as used herein, including technical terms and scientific terms, have the same meanings as commonly understood by those of ordinary skills in the art to which the present disclosure belongs. It also should be understood that those terms such as defined in commonly used dictionaries should be understood as having the meaning in consistence with the meaning in the context of the prior art, and unless specially defined as herein, otherwise it would not be construed with idealized or over-formal meaning.

The embodiments of the present disclosure are intended to solve the problem that actual utilization ratios of some low-frequency accounts are too low, especially to solve the problem that the account utilization ratio is promoted by recycling accounts while user information in each recycled account is saved.

Figure 1:
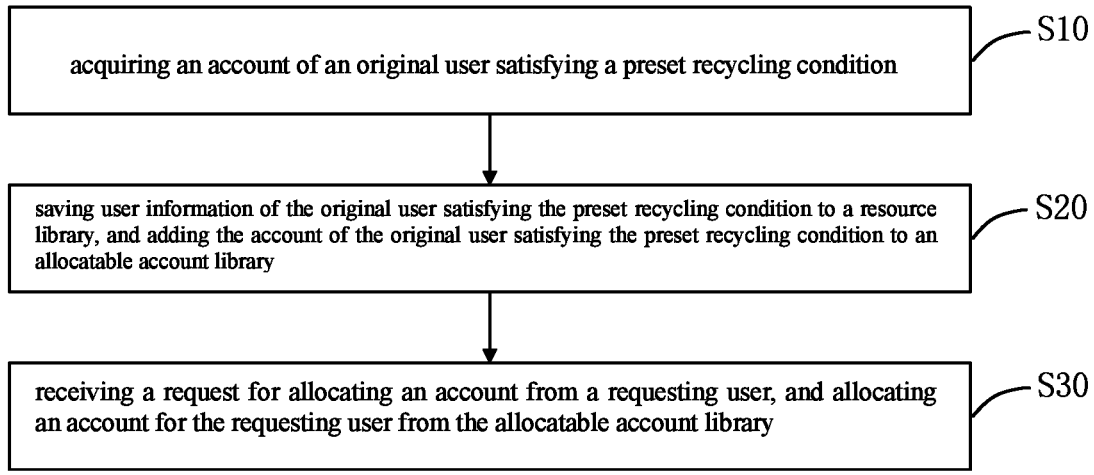
FIG. 1 is a schematic flowchart of an embodiment of a method for sharing account resources of at least one embodiment of the present disclosure.

According to at least one embodiment of the present disclosure, a method for sharing account resources is proposed. As seen in the schematic flowchart shown in FIG. 1, the method comprises the following steps.

At step S10, an account of an original user satisfying a preset recycling condition is acquired.

At step S20, user information of the original user satisfying the preset recycling condition is saved to a resource library, and the account of the original user satisfying the preset recycling condition is added to an allocatable account library.

At step S30, a request for allocating an account is received from a requesting user, and an account for the requesting user is allocated from the allocatable account library.

Acquiring the account of the original user satisfying the preset recycling condition at the step S10 comprises for example: the account of the original user is an account that has been allocated to a particular user which is associated with user information of the particular user, and the user information is continuously updated according to an actual use status of the particular user. The preset recycling condition may be an account recycling condition collectively preset by a system, or may be a recycling condition separately set for a particular account or user; or, the recycling condition may be automatically intelligently adjusted according to a status that a user himself/herself uses an account and a use status for accounts in the whole system.

The acquiring the account of the original user satisfying the preset recycling condition may be implemented by timing tasks so as to periodically collect, update and make statistics on use frequencies for system accounts, and so as to recycle low-frequency accounts meeting the preset condition to the allocatable account library; or may periodically scan the use status of accounts in the allocatable account library which may save allocation time and recycling time for each allocated account, so as to recycle accounts reaching preset use duration; or, users actively broadcast or upload their account information or user information when satisfying the preset recycling condition, so as to make the system be informed of accounts to be recycled timely; or according to the residual status of accounts in the allocatable account library, actively reminding a management user to scan low-frequency accounts, or resetting a use frequency condition for filtering low-frequency users, or resetting a use duration condition for filtering low-frequency users, so as to acquire low-frequency user accounts satisfying new conditions, making it convenient to subsequently match account resources and user requests.

Saving user information of the original user satisfying the preset recycling condition to a resource library and adding the account of the original user satisfying the preset recycling condition to an allocatable account library at the step S20 may comprise for example: when the actual use status of the account satisfies the preset recycling condition, saving user information associated with the account of the original user to a specified resource library for subsequent invocation; adding the account to the allocatable account library; accounts in the allocatable account library are not associated with user information, an account therein would not be associated with user information of a specific user unitl being allocated to the specific user.

Of course, in actual use, it may be able to set more recycling account rules, user information saving rules, and even rules for deleting user information according to actual needs. For example, for the account of the original user which is an account of a department financial reimbursement user shared by multiple person, a particular recycling condition may be preset in order to avoid confusion after recycling; If the user is in a resignation state or other state in which it is not possible to request for an account again, it may also be determined that the user information is directly deleted, thereby reserving space in the resource library and optimizing the subsequent information search speed; the resource library may also set a function to clean up redundant user information periodically to optimize system efficiency.

The order of the two sub-steps of the step S20 can be changed, that is, the step S20 may also comprise: adding the account of the original user satisfying the preset recycling condition to an allocatable account library, and saving user information of the original user satisfying the preset recycling condition to a resource library. Such a change would not affect the implementation of technical solutions of the present disclosure.

Receiving a request for allocating an account from a requesting user and allocating an account for the requesting user from the allocatable account library at the step S30 may comprise: the requesting user may be a new user who has never requested for an account, or may be an original user whose account has been recycled; the request for allocating an account may comprise user permissions of the user requesting for an account, use duration, and other information, in order to match a suitable account from the allocatable account library. The recycled accounts may be able to be allocated to new requesting users again through this step. If the new requesting user is an original user whose account has been recycled, a request for associating with user information of the original user may also be included in the request for allocating an account, in order to acquire the user information of the original user as soon as possible and to reduce search waiting time.

Figure 2:
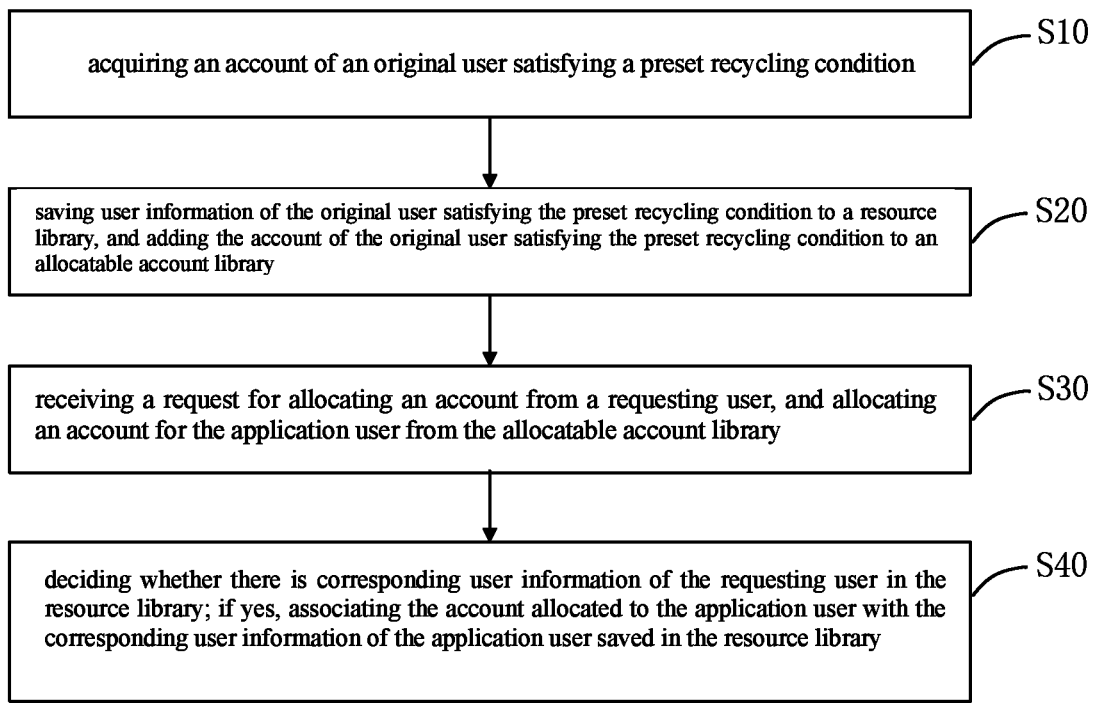
FIG. 2 is a schematic flowchart of an embodiment of a method for sharing account resources of at least one embodiment of the present disclosure.

In the use scenario in which a user whose account has been recycled applies for an account again, the present disclosure also provides another embodiment so that a user who applies for an account again to read previously saved user information, which is convenient for the user to use and improves work efficiency. As shown in FIG. 2, the approach may comprise for example: after the allocating an account for the requesting user from the allocatable account library, at step S40, determining whether there is corresponding user information of the requesting user in the resource library; and if yes, associating the account allocated to the requesting user with the corresponding user information of the requesting user saved in the resource library.

Determining whether there is corresponding user information of the requesting user in the resource library may make a lookup according to a request for associating with user information of the original user actively sent by the requesting user, or may search and match directly in the resource library. In order to improve search match speed, the requesting user may select whether it is a new user or an original user while sending the request for allocating an account. If the requesting user confirms that it is a new user, there is no need to make a match lookup. If the requesting user confirms that it is an original user, the requesting user may be further guided to input the time range of last request for the account or the time range during which the account was recycled, thereby improving search match speed in the resource library and saving time for requesting for an account. If there is corresponding user information of the requesting user in the resource library, it implies that there is a record that the requesting user has used an account before, the corresponding user information of the requesting user in the resource library would be associated with the account allocated to the requesting user, so that the user could read the previous use information and the work efficiency of the user could be improved.

The method of the present embodiment separates the user information of the user and the account of the user while recycling the account, so that the user's personal information can be saved for reading in the next request, and the account can be reallocated to increase the use rate of the account.

Figure 3:
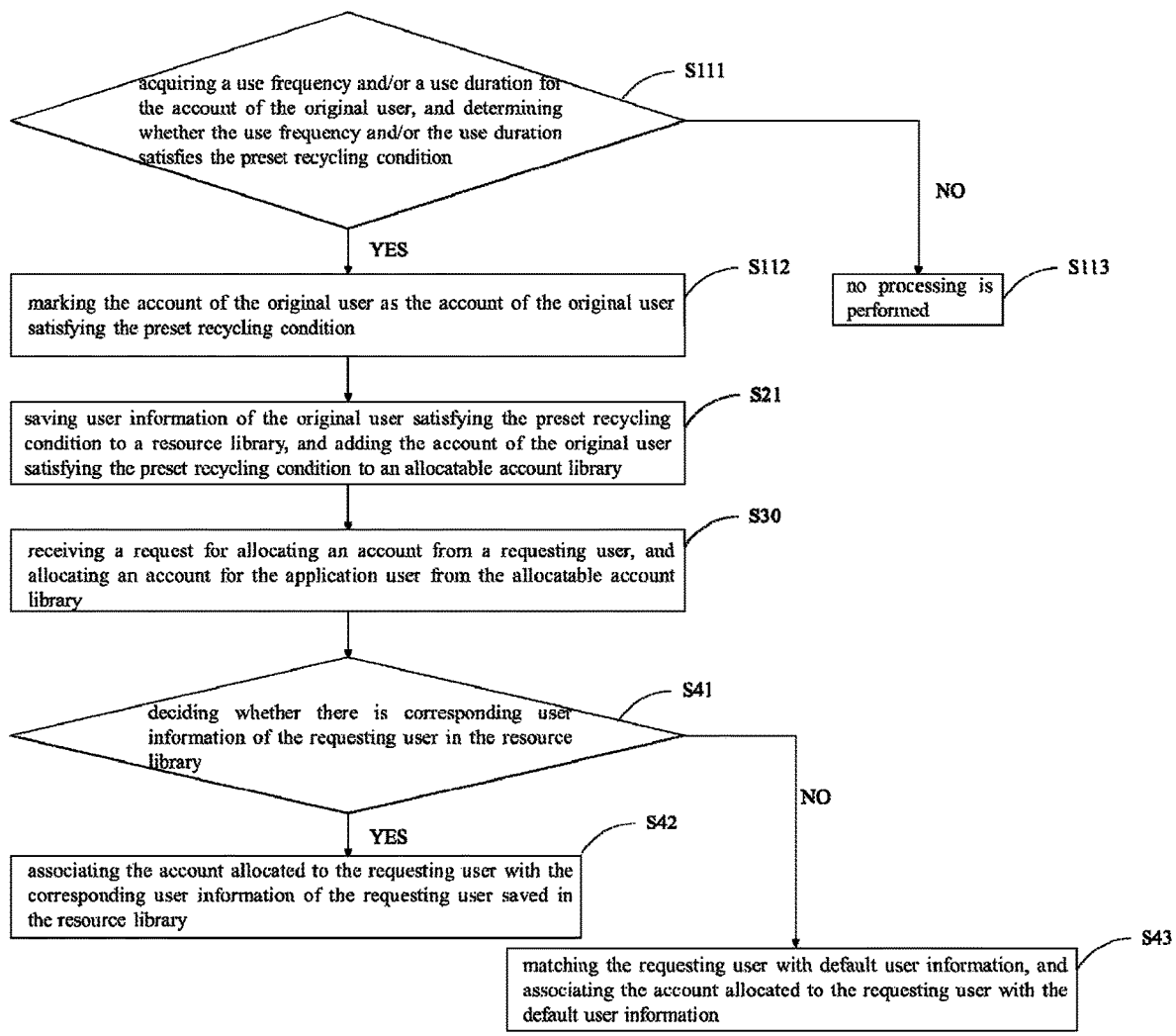
FIG. 3 is a schematic flowchart of another embodiment of a method for sharing account resources of at least one embodiment of the present disclosure.

The present disclosure also provides another embodiment, as shown in FIG. 3, one of the differences between this embodiment and the last embodiment is that a determining criteria for the preset recycling condition is set: for example, the method of acquiring the account of an original user satisfying the preset recycling condition may comprise the following steps.

At step S11, a use frequency and/or a use duration for the account of the original user is acquired, whether the use frequency and/or the use duration satisfies the preset recycling condition is determined, and if yes, the account of the original user is marked as the account of the original user satisfying the preset recycling condition.

The step S11 may comprise three steps as below, for example.

At step S111, a use frequency and/or a use duration for the account of the original user is acquired, whether the use frequency and/or the use duration satisfies the preset recycling condition is determined, and if yes, step S112 is performed; if no, step S113 is performed.

At the step S112, the account of the original user is marked as the account of the original user satisfying the preset recycling condition.

At the step S113, no processing is performed.

Accounts to be recycled are usually low-frequency accounts, or accounts reaching a specified use duration. A timing task module can be provided in the system for collecting and updating user information and account information. The module may perform two functions: one function is periodically making statistics on each account in an account resource pool, and use frequencies and use durations for the account of the current user, so as to recycle low-frequency accounts to the allocatable account library, the account resource pool comprises the allocatable account library and an allocated account library; another function is periodically scanning preset use durations for each account stored in the account resource pool, so as to recycle accounts reaching the specified use duration. To avoid mis-determination, determinations may be made via combining use frequencies with use durations. For example, if the use duration for the user is one month, but the use frequency for that user is quite high, which exceeds the average use frequency for users in the system currently, the preset use duration for that user may be automatically extended, or the user may be reminded to send a request to extend the use duration, or the administrator may be reminded of whether it is required to extend the preset use duration for that user.

After determining whether the use frequency or the use duration for the account of the original user or the combination thereof satisfies the preset recycling condition, step S112 is performed: marking the account of the original user as the account of the original user satisfying the preset recycling condition. After the marking is completed, as seen in step S21 in FIG. 3, user information of the original user satisfying the preset recycling condition is saved to a resource library, and the account of the original user satisfying the preset recycling condition is added to an allocatable account library, thus the recycling steps are completed. If subsequently an original user whose account has been recycled applies for an account again, the saved user information of the original user may be read from the resource library. Compared with a standard setting of a brand new account, the embodiments of the present disclosure may enable users to quickly acquire previous historical information through reading previous user information, which improves work efficiency of the users.

At step S113 in the present disclosure in which the decision is NO, no processing is performed. "no processing" may comprise, for example, not recycling the account, and continuing to monitor use status of the account or the user; if the account has approached the recycling condition, but has not satisfied the recycling condition yet, the account may not be recycled, and reminder information may be sent to the user that the account belongs to at the meantime, so as to enable the user to foreknow the state of the account timely.

As previously described, the method for acquiring the use frequency and/or the use duration for the account of the original user may be implemented through system periodical query, or through actively broadcasting or uploading by the user when the account of the user satisfies the preset recycling condition. For example, its technical solutions comprises the following two: querying the use frequency and/or the use duration for the account of the original user periodically to acquire the account of the original user satisfying the preset recycling condition; or automatically marking the account of the original user as the account of the original user satisfying the preset recycling condition if the use frequency and/or the use duration for the account of the original user satisfies the preset recycling condition.

Both these two methods need to preset the recycling condition, for example: if the use frequency for the account is below 30 days per time, the account is taken as an account satisfying the recycling condition; or, while allocating an account, the longest use duration for the acquired account is 100 days, once 100 days is reached, the account is taken as an account satisfying the recycling condition. The first method of periodical query may acquire more comprehensive account information, and may also set or modify filter query condition in accordance with specific circumstances, and determine whether these accounts are required to be recycled in accordance with specific circumstances. The second method of user automatically marking improves query efficiency through actively broadcasting or uploading accounts by users without querying one by one by the system; the system may determine accounts required to be recycled from the accounts broadcast or uploaded actively by the users to avoid mistakenly recycling. These two methods may directly automatically acquire the account of the original user satisfying the preset recycling condition through presetting the recycling condition without manual participation in filtering.

In actual use, if accounts in the allocatable account library are sufficient, recycling function for the accounts may be cancelled; or when the number of the accounts is in shortage, use frequencies for the accounts may be ranked, so that accounts with lower use frequencies are directly taken as alternative accounts to be recycled, and then the top ranked accounts are selected from the alternative accounts to be recycled for recycling. Technical solutions comprise, for example, the acquiring the account of the original user satisfying the preset recycling condition comprising: acquiring a list of accounts for original users satisfying preset alternative recycling conditions; ranking accounts in the list of accounts according to use frequencies, and taking accounts with low use frequencies as the accounts of the original users satisfying the preset recycling condition.

The accounts with low use frequencies may be several accounts with lowest use frequency in the account ranking. For example, the accounts with the lowest use frequency may be find through a comparison algorithm of the program, and then multiple accounts with lowest use frequency may be acquired in order through looping execution of the comparison algorithm; or the average use frequency of the accounts may be determined in accordance with the ranking, then accounts with use frequencies lower than the average use frequency may be taken as accounts with low use frequencies.

The embodiment of the present technical solution differs from the embodiment shown in FIG. 3 in that: the embodiment shown in FIG. 3 is suitable for recycling accounts with frequencies lower than preset frequency (other recycling conditions may also be preset), which has no relation to the ranking of use frequencies for users. The present embodiment is suitable for taking the ranking of use frequencies for accounts as a reference and recycling a particular number of accounts or particular accounts. When use frequencies and/or use durations for all users do not satisfy the preset recycling condition, the present embodiment provides another method for determining whether to recycle the account, so that the deficiency of the embodiment shown in FIG. 3 may be made up. For example, if the system has not found accounts satisfying the preset recycling condition through periodical query, however, it is required to recycle several accounts to allocate them to new requesting users, then the system may filter out an list of accounts of alternative original users through particular conditions, and then rank the accounts in the list in accordance with use frequencies for accounts in the list of accounts and take several users with lowest use frequency as the accounts of the original users satisfying the preset recycling condition. Of course, other specific circumstances may also be combined to determine accounts required to be recycled, such as use durations, account permissions and the like.

In order to determine the duration for the user's next use of an account, that is, the use duration in the preset recycling condition, calculation may be made according to the user's historical use record so as to balance the account utilization ratio and user experience. Therefore, after the acquiring the account of the original user satisfying the preset collection condition, the method further comprises: at step S12, reading a current use duration and a historical use duration for the original user and calculating a next use duration to be saved to the use information of the original user.

Methods for calculating may employ average method or difference method or the like, or combine with the use frequency for the user, as a reference for calculating the use duration. For example, the current use duration and the last two historical use durations for the user whose account is to be recycled are utilized to calculate the average use duration as the use duration for the user's next request for an account; or, referring to the use frequency of the user, if the user's use frequency reaches a certain set value, then the foresaid average use duration performs operation (e.g., multiplication) with a corresponding weighting parameter, the result of the operation is saved as the use duration for the user's next request for an account. After the original user's account has been recycled, when the original user applies for an account again, the previously calculated and saved use duration for next request for an account is taken as the preset use duration for the user's present request for an account; if the user's actual use duration reaches the preset use duration, the account would be recycled again. Of course, when calculating the average use duration or other time parameters, it may also refer to the historical use durations of all the recycled accounts, but not limited to the user's own use duration.

In an example, setting the use frequency in the user preset recycling condition may be calculated according to the user's own use frequency, or may also refer to use frequencies for all the users in the resource library, and combine with users' permissions, whether the accounts are public accounts, and other factors as references.

Before recycling the account, a notification may be sent to the user, so that the user can process relevant information in time, or learn how to request for an account again, and how to read the saved user information and the like. Therefore, the present disclosure also provides an embodiment which includes sending a notification message to the original user at step S13 before adding the account of the original user satisfying the preset recycling condition to the allocatable account library.

The notification may be sent to a mailbox associated with the user information via email, or sent to a mobile phone via SMS, or the user may be informed through directly pushing a reminder message to the user in the system and other approaches. The content of the notification message may include a reminder that the account is to be recycled, a method for requesting for an account again, how to associate user information again when requesting for an account again, and a verification code for associating user information and the like.

When the account is recycled, considering the use state of the original user corresponding to the account, the present disclosure further provides that before the adding the account of the original user satisfying the preset recycling condition to the allocatable account library, the method comprises: at step S14, determining whether the account of the original user is in a use state; if no, the account of the original user satisfying the preset recycling condition is added to the allocatable account library.

At that step, if the account has satisfied the recycling condition such as the preset use duration or the preset use frequency, the method continues to determine whether the account of the user is in a use state; the use state comprises whether the user is currently logged in, whether the user currently has an account operation, and whether the user currently has an unfinished IT process and other states. For example, in the enterprise management system, an account recently initiated a reimbursement process, but the process is still in an intermediate audit state which is not over, it is determined that the account is still in the use state and the account will not be recycled. If the account is not used currently, the account will be recycled to the allocatable account library for subsequent allocation to other users for use.

When determining whether there is corresponding user information of the requesting user in the resource library is performed, a recognition mark for the user information is required to be preset so that corresponding user information could be quickly matched through the recognition mark when the user request for an account again. Therefore, the present disclosure also provides that the user information includes an identification ID of the user, the received request for allocating an account from the requesting user comprises an identification ID of the requesting user; the determining whether there is corresponding user information of the requesting user in the resource library comprises: comparing the identification ID of the requesting user with identifications ID in user information saved in the resource library, so as to acquire user information corresponding to the identification ID of the requesting user.

The identification ID of the user may be unique recognition information of the user, such as the user's real name, ID number, job number, email address, mobile phone number, and the like, or may be a recognition code or an identity mark calculated from the unique recognition information. When the user information is saved, a corresponding verification code may be calculated for the identification ID, and the verification code is sent to the original user in the manner of the foresaid notification message; when the requesting user wants to acquire the user information or associate the user information with the account, the requesting user may be required to input the corresponding verification code to ensure that the current requesting user and the original user to which the user information saved in the resource library belongs are the same user, or confirm that the operation of the current requesting user reading the user information or the operation of associating the user information with the account has been authorized by the original user.

At step S40 in the embodiment, the determining whether there is corresponding user information of the requesting user in the resource library may also comprises: at step S41, determining whether there is corresponding user information of the requesting user in the resource library; if yes, step S42 is performed; if no, step S43 is performed.

At the step S42, if yes, the account allocated to the requesting user is associated with the corresponding user information of the requesting user saved in the resource library.

At the step S43, if no, a default user information is matched for the requesting user, and the account allocated to the requesting user is associated with the default user information.

As shown in FIG. 3, if the requesting user is an original user, that is, a user who previously requested for an old account, when the old account was recycled, the user information of the original user would be saved in the resource library, and such user information could be found from the resource library when the original user requests for an account again; if the use information cannot be found, it is determined that the requesting user is a new user, a default user information is matched for the new user and associated with the account allocated to the requesting user according to the preset rules; the default user information may comprise account information such as user permissions, user use duration, account requesting time and the like, and may also comprise software setting information such as system operation guide, default functional interface and the like; therefore, if the requesting user is an original user, the requesting user may not only read original account information, but also read information related to original software setting, which makes user operations more convenient.

In an example, after associating the account allocated to the requesting user with the corresponding user information of the requesting user saved in the resource library, or after associating the account allocated to the requesting user with the default user information, the present disclosure may comprise: at step S50, returning the account and user information as associated to the requesting user.

Of course, before returning the account and user information as associated to the requesting user, the present disclosure may also comprise an audit step or check step or the like, so as to confirm that the returned account complies with system preset conditions or other specific conditions, which is not further described here.

In order to facilitate the recognition of users and accounts, and statistics of relevant information, the user information may include one or more of the user's identification ID, historical use duration, current use duration, next use duration, use frequency, user permissions, and collection information. Of course, the user information may further include the foresaid verification code, number of use, use time, and other information.

According to the above-described user information, the present disclosure may also make statistics on and output one or more of the account information that has associated with the user information, the account information in the allocatable account library, and the user information saved in the resource library, that is, the account information that has been used and its corresponding user information, as well as unallocated account information in the allocatable account library and all the user information saved in the resource library may be output. Of course, the condition for deleting the user information may also be preset. For example: if a user to which the user information saved in the resource library belongs has not requested for an account for more than five years, and the saved user information is outdated or cannot match the latest system, the user information may be deleted in order to reserve space in the resource library.

Figure 4:
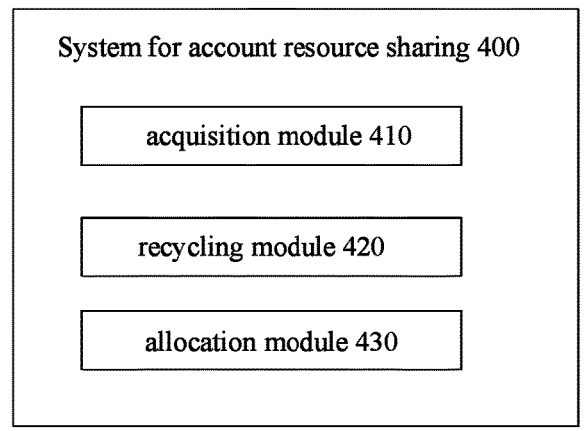
FIG. 4 is a schematic diagram of a system for sharing account resources of at least one embodiment of the present disclosure.

The present disclosure also provides a system for sharing account resources, as shown in FIG. 4. The system for sharing account resources 400 comprises: an acquisition module 410 configured to acquire an account of an original user satisfying a preset recycling condition; a recycling module 420 configured to save user information of the original user satisfying the preset recycling condition to a resource library, and to add the account of the original user satisfying the preset recycling condition to an allocatable account library; and an allocation module 430 configured to receive a request for allocating an account from a requesting user, and to allocate an account for the requesting user from the allocatable account library.

In order to facilitate users whose accounts have been recycled to request for accounts again, the system for sharing account resources may further comprise: an association module configured to determine whether there is corresponding user information of the requesting user in the resource library; if yes, to associate the account allocated to the requesting user with the corresponding user information of the requesting user saved in the resource library.

Based on the above modules of the system for sharing account resources, the present disclosure may further include the following functional units: an interface unit, an intelligent analysis unit, an intelligent processing unit, a dynamic management unit, a timing task unit, a query unit, and a message unit.

The interface unit is a unit for the system to interact with a front-end system. A user issues a request for allocating an account at the front-end system, the request arrives at the foresaid system of the present disclosure via a middleware; after receiving the request for the requesting user for allocating an account, after subsequent processing by the intelligent analysis unit, the system returns account password and other information to the front-end system; generally, the interface module is directly connected to the middleware and the middleware is connected to the front-end system.

The intelligent analysis unit comprises two parts. One part utilizes the results of timing tasks to analyze the use status of the allocated accounts and allocatable accounts in the account resource pool in the current system, especially to include users with low use frequencies in the system into the account resource pool for centralized management. Another part analyzes the results that need for allocating according to the request of the requesting user, the user information saved in the resource library (user permissions, contents of the user's favorites, the user's use duration, and the like) and the account allocation status in the account resource pool.

The intelligent processing unit comprises three parts. The first part allocates account password and other feedbacks to the requesting user in the system and updates the account status in the account resource pool in time according to the analyzed results by the intelligent analysis unit. The second part finds accounts satisfying the preset recycling condition from the system timely and recycles accounts satisfying the preset recycling condition to the allocatable account library according to the functions of the following timing task unit. The third part makes statistics on and analyzes the duration for the requesting user to use the account actually while recycling, the longest time among the recent use durations for the requesting user may be taken as the account preset use duration for the user to allocate an account again subsequently.

The dynamic management unit is configured to: dynamically manage account resource in the account resource pool, user information resource, permissions resource, and favorites resource of the user, and the like; according to the users with low use frequencies acquired by the intelligent analysis unit, automatically add the users' accounts to the allocatable account library, automatically save user information such as the users' permissions information, favorites, and the like into the resource library, and automatically inform the users of the manner of requesting for an account again subsequently via email or SMS.

The timing task unit is configured to collect and update information, which mainly includes two operation functions: the first one is to make statistics on use frequencies of accounts in the account resource pool periodically, so that the intelligent analysis unit could recycle accounts of users with low use frequencies to the account resource pool; the second one is to scan the use status of allocated accounts in the current system periodically for recycling accounts satisfying the recycling condition.

The query unit is configured to query the dynamic use status of the current account resource pool, and query user information of the requesting users in the account resource pool, such as permissions information, favorites information, and the like.

The message unit is configured to send a message notification to the user, in order to prompt the user the notification that the account is to be recycled, the notification that the account has been recycled, and the notification of requesting for an account.

According to the above methods for sharing account resources, the present disclosure also provides a computer-readable storage medium storing computer programs thereon, the computer programs when executed implementing the steps of any one of the above-described methods for sharing account resources.

According to the above computer-readable storage medium, the present disclosure also provides an apparatus for sharing account resources, which comprises said computer-readable storage medium, a processor, and computer programs stored on said computer-readable storage medium and executed on the processor; when the processor executes said computer programs, the steps of any one of the above-described methods for sharing account resources are implemented.

The various modules in the various embodiments of the present disclosure may be integrated in one processing module, or each unit may exist separately and physically, or two or more units may be integrated in one module. The above integrated module may be implemented in the form of hardware, or in the form of software functional module. If the integrated module is implemented in the form of software functional module and is sold and used as an individual product, it may be stored in a computer-readable storage medium.

According to the embodiments of the present disclosure, original user information would not be cleared out but would be saved to the resource library when the account is recycled, the saved original user information may be read from the resource library when the original user requests for an account again, which enables the original user to acquire the original information and relevant settings more quickly, such that the work efficiency could be improved. The recycled account is added to the allocatable account library, its association with the original user is cancelled for reallocation to a new requesting user for use. On the one hand, the present disclosure may recycle low-frequency accounts with low use rates and reallocate them to new requesting users, improving the circulation speed and the use rate of the accounts; on the other hand, the present disclosure saves user information of each original user, making it convenient for original users to acquire previous relevant information quickly and improving users' work efficiencies and experiences. The present disclosure is suitable for systems in which the number of users is larger than the number of accounts, or IT systems in which the number of accounts is limited, so that one account may correspond to multiple low-frequency use users or staffs, improving the account utilization ratio, which may reduce the number of accounts and save account fees.

According to the embodiments of the present disclosure, whether to recycle the account is determined by the use frequency or the use duration for the account of the original user; an account use duration may be preset when the account is allocated to the original user, so that whether to recycle the account is determined according to whether the actual use duration for the user reaches the preset use duration; or, the use frequency for the user may be calculated through the user's historical data, whether to recycle the account is determined by whether the actual use frequency for the user is lower than the preset use frequency; or, the decision is made by combining both the use frequency and the use duration, thereby reducing the probability of mistakenly recycling; an approach of acquiring the use frequency or the use duration for the account of the original user may be that the user marks and reports by himself/herself such that system calculations could be reduced, or may be that the system conducts queries and statistics periodically in order to learn user data and account data timely, making it convenient for deployment.

According to the embodiments of the present disclosure, various information such as the user's historical use duration, use frequency, use permissions, collection information, and the like may be learned through user information saved in the resource library, making it convenient for statistics and outputting; at the same time, the use duration for the user's next request for an account may be calculated according to the user's current use duration while recycling and historical use duration, optimizing the use cycle of the account and further improving the use rate of the account.

The above is merely part of implementations of the present disclosure. It should be pointed out that for those with ordinary skills in the art, various improvements and modifications could be made without departing form the principal of the present disclosure, these improvements and modifications should be regarded as the protection scope of the present disclosure as well.

What is claimed is:

1. A method for sharing account resources, comprising:
acquiring an account of an original user satisfying a preset recycling condition by querying the at least one of use frequency or use duration for the account of the original user periodically, wherein the preset recycling condition is at least one of the use frequency for the account of the original user being lower than a preset use frequency threshold or a use duration of the account of the original user reaching a preset use duration threshold;
marking the account of the original user satisfying the preset recycling condition, saving user information of the original user satisfying the preset recycling condition to a resource library, and sending a notification message to the original user before adding the account of the original user satisfying the preset recycling condition to an allocatable account library; and
receiving a request for allocating an account from a requesting user, determining whether there is corresponding user information of the requesting user in the resource library, if yes, associating the account allocated to the requesting user with the corresponding user information of the requesting user saved in the resource library, determining whether there is corresponding user information of the requesting user in the resource library, and, otherwise, allocating an account for the requesting user from the allocatable account library by matching the requesting user with default user information, and associating the account allocated to the requesting user with the default user information.

2. The method according to claim 1, wherein the acquiring the account of the original user satisfying the preset recycling condition comprises:
acquiring a list of accounts for original users satisfying preset alternative recycling conditions; and
ranking accounts in the list of accounts according to use frequencies, and taking accounts with low use frequencies as the accounts of the original users satisfying the preset recycling condition.

3. The method according to claim 1, wherein after the acquiring the account of the original user satisfying the preset recycling condition, the method further comprises:
reading a current use duration and a historical use duration for the original user and calculating a next use duration to be saved to the use information of the original user.

4. The method according to claim 1, wherein before adding the account of the original user satisfying the preset recycling condition to the allocatable account library, the method comprises:
determining whether the account of the original user is in a use state; and
if no, adding the account of the original user satisfying the preset recycling condition to the allocatable account library.

5. The method according to claim 1, wherein the user information includes an identification ID of the user, the received request for allocating an account from the requesting user comprises an identification ID of the requesting user;
  wherein the determining whether there is corresponding user information of the requesting user in the resource library comprises:
  comparing the identification ID of the requesting user with identifications ID in user information saved in the resource library, so as to acquire user information corresponding to the identification ID of the requesting user.

6. The method according to claim 1, wherein the user information includes one or more of the user's identification ID, historical use duration, current use duration, next use duration, use frequency, user permissions, and collection information.

7. The method according to claim 1, wherein the method further comprises:
  making statistics on and outputting one or more of account information that has been associated with user information, account information in the allocatable account library, and user information saved in the resource library.

8. A non-transitory computer-readable storage medium storing computer programs thereon, the computer programs when executed implementing the steps of any one of the methods for sharing account resources according to claim 1.

9. An apparatus for sharing account resources, comprising:
  a processor; and
  a memory communicatively coupled with and readable by the processor and having stored therein which, when executed by the processor, causes the processor perform the steps including:
  acquiring an account of an original user satisfying a preset recycling condition by querying the at least one of use frequency or use duration for the account of the original user periodically, wherein the preset recycling condition is at least one of the use frequency for the account of the original user being lower than a preset use frequency threshold or a use duration of the account of the original user reaching a preset use duration threshold;
  marking the account of the original user satisfying the preset recycling condition, saving user information of the original user satisfying the preset recycling condition to a resource library, and sending a notification message to the original user before adding the account of the original user satisfying the preset recycling condition to an allocatable account library; and
  receiving a request for allocating an account from a requesting user, determining whether there is corresponding user information of the requesting user in the resource library, if yes, associating the account allocated to the requesting user with the corresponding user information of the requesting user saved in the resource library, and otherwise allocating an account for the requesting user from the allocatable account library by matching the requesting user with default user information, and associating the account allocated to the requesting user with the default user information.

10. The apparatus according to claim 9, wherein the acquiring the account of the original user satisfying the preset recycling condition comprises:
  acquiring a list of accounts for original users satisfying preset alternative recycling conditions; and
  ranking accounts in the list of accounts according to use frequencies, and taking accounts with low use frequencies as the accounts of the original users satisfying the preset recycling condition.

11. The Apparatus according to claim 9, wherein after the acquiring the account of the original user satisfying the preset recycling condition, the processor perform the steps including:
  reading a current use duration and a historical use duration for the original user and calculating a next use duration to be saved to the use information of the original user.

12. The Apparatus according to claim 9, wherein before adding the account of the original user satisfying the preset recycling condition to the allocatable account library, the processor perform the steps including:
  determining whether the account of the original user is in a use state; and
  if no, adding the account of the original user satisfying the preset recycling condition to the allocatable account library.

13. The Apparatus according to claim 9, wherein allocating an account for the requesting user from the allocatable account library comprises matching the requesting user with default user information, and associating the account allocated to the requesting user with the default user information.

14. A system for sharing account resources, the system comprising:
  an acquisition module configured to acquire an account of an original user satisfying a preset recycling condition by querying the at least one of use frequency or use duration for the account of the original user periodically, wherein the preset recycling condition is at least one of the use frequency for the account of the original user being lower than a preset use frequency threshold or a use duration of the account of the original user reaching a preset use duration threshold;
  a recycling module configured to mark the account of the original user satisfying the preset recycling condition, save user information of the original user satisfying the preset recycling condition to a resource library, and to send a notification message to the original user before adding the account of the original user satisfying the preset recycling condition to an allocatable account library; and
  an allocation module configured to receive a request for allocating an account from a requesting user, determine whether there is corresponding user information of the requesting user in the resource library, if yes, associate the account allocated to the requesting user with the corresponding user information of the requesting user saved in the resource library, and otherwise to allocate an account for the requesting user from the allocatable account library by matching the requesting user with default user information, and associating the account allocated to the requesting user with the default user information.

\* \* \* \* \*